US 10,718,245 B2

(12) United States Patent
Dou et al.

(10) Patent No.: US 10,718,245 B2
(45) Date of Patent: Jul. 21, 2020

(54) EXHAUST GAS TREATMENT SYSTEM AND METHOD HAVING IMPROVED LOW TEMPERATURE PERFORMANCE (71) Applicant: Deere & Company, Moline, IL (US)

(72) Inventors: Danan Dou, Cedar Falls, IA (US); Shyan-Cherng Huang, Cedar Falls, IA (US); Ayyappan Ponnaiyan, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/007,774

(22) Filed: Jun. 13, 2018

(65) Prior Publication Data
US 2019/0383192 A1 Dec. 19, 2019

(51) Int. Cl.
F01N 3/20 (2006.01)
F01N 3/035 (2006.01)
F01N 3/10 (2006.01)

(52) U.S. Cl.
CPC .......... F01N 3/2073 (2013.01); F01N 3/035 (2013.01); F01N 3/106 (2013.01);
(Continued)

(58) Field of Classification Search
CPC ............... F01N 13/009; F01N 13/0093; F01N 2610/10; F01N 2610/105
See application file for complete search history.

(56) References Cited

U.S. PATENT DOCUMENTS 8,776,495 B2  7/2014  Gonze et al.
9,038,373 B2  5/2015  Geveci et al.
(Continued)

FOREIGN PATENT DOCUMENTS

DE  102015223475 A1  6/2016
EP  1259308 A1  11/2002
(Continued)

OTHER PUBLICATIONS

Loughborough University, "ACCT—Low Temperature Ammonia Delivery using AdBlue," Integer Emissions Summit—USA, Nov. 7-8, 2017 (19 pages).
(Continued)

Primary Examiner — Jonathan R Matthias
(74) Attorney, Agent, or Firm — Michael Best & Friedrich LLP (57) ABSTRACT An exhaust gas treatment system for an internal combustion engine includes an exhaust gas pathway configured to receive exhaust gas from the internal combustion engine, a temperature sensor configured to sense a temperature of the exhaust gas, a first injector configured to inject a first reductant into the exhaust gas pathway at a first location when the sensed temperature is below a threshold temperature, and a first treatment element positioned downstream of the first location. A second injector is configured to inject a second reductant of a different composition than the first reductant into the exhaust gas pathway at a second location downstream of the first treatment element when the sensed temperature is above the threshold temperature. The system further includes a second treatment element positioned downstream of the second location.

16 Claims, 4 Drawing Sheets (52) U.S. Cl.
CPC ...... *F01N 2250/02* (2013.01); *F01N 2560/06* (2013.01); *F01N 2570/14* (2013.01); *F01N 2570/18* (2013.01); *F01N 2590/08* (2013.01); *F01N 2900/1404* (2013.01)

(56) References Cited

U.S. PATENT DOCUMENTS

| | | |
|---|---|---|
| 9,132,386 B2 | 9/2015 | Udd et al. |
| 9,393,523 B2 | 7/2016 | Dougnier et al. |
| 9,586,831 B2 | 3/2017 | Fujita et al. |
| 9,771,850 B2 | 9/2017 | Henry et al. |
| 9,988,999 B2 | 6/2018 | Ancimer et al. |
| 10,024,259 B2 | 7/2018 | Ota |
| 2005/0069476 A1 | 3/2005 | Blakeman et al. |
| 2011/0138780 A1 | 6/2011 | Millet et al. |
| 2011/0197569 A1* | 8/2011 | Salanta ............... F01N 3/206 60/286 |
| 2014/0311123 A1 | 10/2014 | Gonze et al. |
| 2015/0052878 A1 | 2/2015 | Qi |
| 2015/0167526 A1* | 6/2015 | Henry ............... F01N 3/103 60/274 |
| 2016/0153335 A1* | 6/2016 | Itoh ............... F01N 3/208 422/109 |
| 2016/0298514 A1* | 10/2016 | Raux ............... F01N 3/208 |
| 2017/0204762 A1* | 7/2017 | Kotrba ............... B01D 53/9409 |
| 2018/0258811 A1* | 9/2018 | Nilsson ............... F01N 3/206 |

FOREIGN PATENT DOCUMENTS

| | | |
|---|---|---|
| EP | 2819769 A1 | 1/2015 |
| KR | 20170013687 A | 2/2017 |

OTHER PUBLICATIONS

Wahlco, Inc., "Ammonia on Demand—Urea Hydrolysis System," Brochure publically available at least as early as Jan. 2016 (4 pages).

United States Patent Office Action for U.S. Appl. No. 16/007,776 dated Oct. 31, 2019 (9 pages).

European Search Report issued in counterpart application No. 19175373.0 dated Aug. 9, 2019. (9 pages).

European Search Report issued in counterpart application No. 19175383.9 dated Aug. 9, 2019. (9 pages).

Notice of Allowance issued by the United States Patent Office for U.S. Appl. No. 16/007,776 dated May 14, 2020 (9 pages).

* cited by examiner

EXHAUST GAS TREATMENT SYSTEM AND METHOD HAVING IMPROVED LOW TEMPERATURE PERFORMANCE

BACKGROUND

The present disclosure relates to exhaust systems and more particularly to diesel exhaust gas treatment systems.

Diesel exhaust is typically subject to emissions regulations covering a variety of emission components, including particulate matter and nitrogen oxides ($NO_x$). A variety of exhaust treatment devices have been developed to reduce these emission components. For example, a diesel particulate filter (DPF) can be used to trap diesel particulate matter and oxidize soot, and a selective catalytic reduction (SCR) element can be used to convert the $NO_x$ present in exhaust gas into other compounds, such as nitrogen, water, and carbon dioxide. A selective catalytic reduction on filter (SCR+F) element combines SCR and DPF functionality such that $NO_x$ reduction and particulate matter filtration and oxidation can occur in a single element.

Typically, diesel exhaust fluid (DEF)—a solution of urea and deionized water—is injected upstream of the SCR element to provide ammonia, which acts as a reducing agent and reacts with the $NO_x$ in the presence of the SCR catalyst in accordance with Equation (1):

$$NO+NO_2+2NH_3 \rightarrow 2N_2+3H_2O \text{ tm (1)}$$

The $NO_x$ and ammonia are thus converted into nitrogen and water.

SUMMARY

A diesel oxidation catalyst (DOC) is typically provided upstream of a SCR and DPF or a SCR+F element. The DOC includes one or more precious group metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions at exhaust temperatures above 250 degrees Celsius. However, at low temperatures (e.g., about 200 degrees Celsius or less) that occur during a cold start state of the engine or during very cold ambient operating conditions, the DOC will consume $NO_2$ by reacting $NO_2$ with carbon monoxide and hydrocarbons in the exhaust gas. This reduces the efficacy of downstream SCR or SCR+F elements, which require the presence of $NO_2$. The DOC also adds thermal mass to the exhaust gas treatment system, which delays warm-up of the SCR or SCR+F elements. In addition, injecting DEF into exhaust gas at low temperatures can result in the undesirable formation of urea deposits.

Low temperature $NO_x$ reduction is an increasingly important consideration as emissions regulations become more stringent. Accordingly, a need exists for an exhaust gas treatment system able to effectively reduce $NO_x$ from exhaust gas at low temperatures.

The present disclosure provides, in one aspect, an exhaust gas treatment system for an internal combustion engine including an exhaust gas pathway configured to receive exhaust gas from the internal combustion engine. The system includes a temperature sensor configured to sense a temperature of the exhaust gas, a first injector configured to inject a first reductant into the exhaust gas pathway at a first location when the sensed temperature is below a threshold temperature, and a first treatment element positioned downstream of the first location. A second injector is configured to inject a second reductant of a different composition than the first reductant into the exhaust gas pathway at a second location downstream of the first treatment element when the sensed temperature is above the threshold temperature. The system further includes a second treatment element positioned downstream of the second location.

The present disclosure provides, in another aspect, an exhaust gas treatment system for an internal combustion engine including an exhaust gas pathway configured to receive exhaust gas from the internal combustion engine. The system includes a first injector configured to inject an ammonium carbamate into the exhaust gas pathway at a first location during a first operating state of the exhaust gas treatment system, a first treatment element positioned downstream of the first location, and a reservoir configured to store a volume of diesel exhaust fluid. The system also includes a reaction chamber configured to convert diesel exhaust fluid from the reservoir into additional ammonium carbamate solution during a second operating state of the exhaust gas treatment system and to supply the ammonium carbamate solution to the first injector during the first operating state.

The present disclosure provides, in another aspect, an exhaust gas treatment system for an internal combustion engine including an exhaust gas pathway configured to receive exhaust gas from the internal combustion engine. The system includes a first injector configured to selectively inject a first reductant into the exhaust gas pathway at a first location, a first treatment element positioned downstream of the first location, a reservoir configured to store a volume of the second reductant of a different composition than the first reductant, and a second injector configured to selectively inject the second reductant into the exhaust gas pathway at a second location downstream of the first treatment element. The system also includes a reaction chamber configured to receive a quantity of the second reductant from the reservoir and to selectively convert the second reductant into the first reductant.

Other features and aspects of the disclosure will become apparent by consideration of the following detailed description and accompanying drawings.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
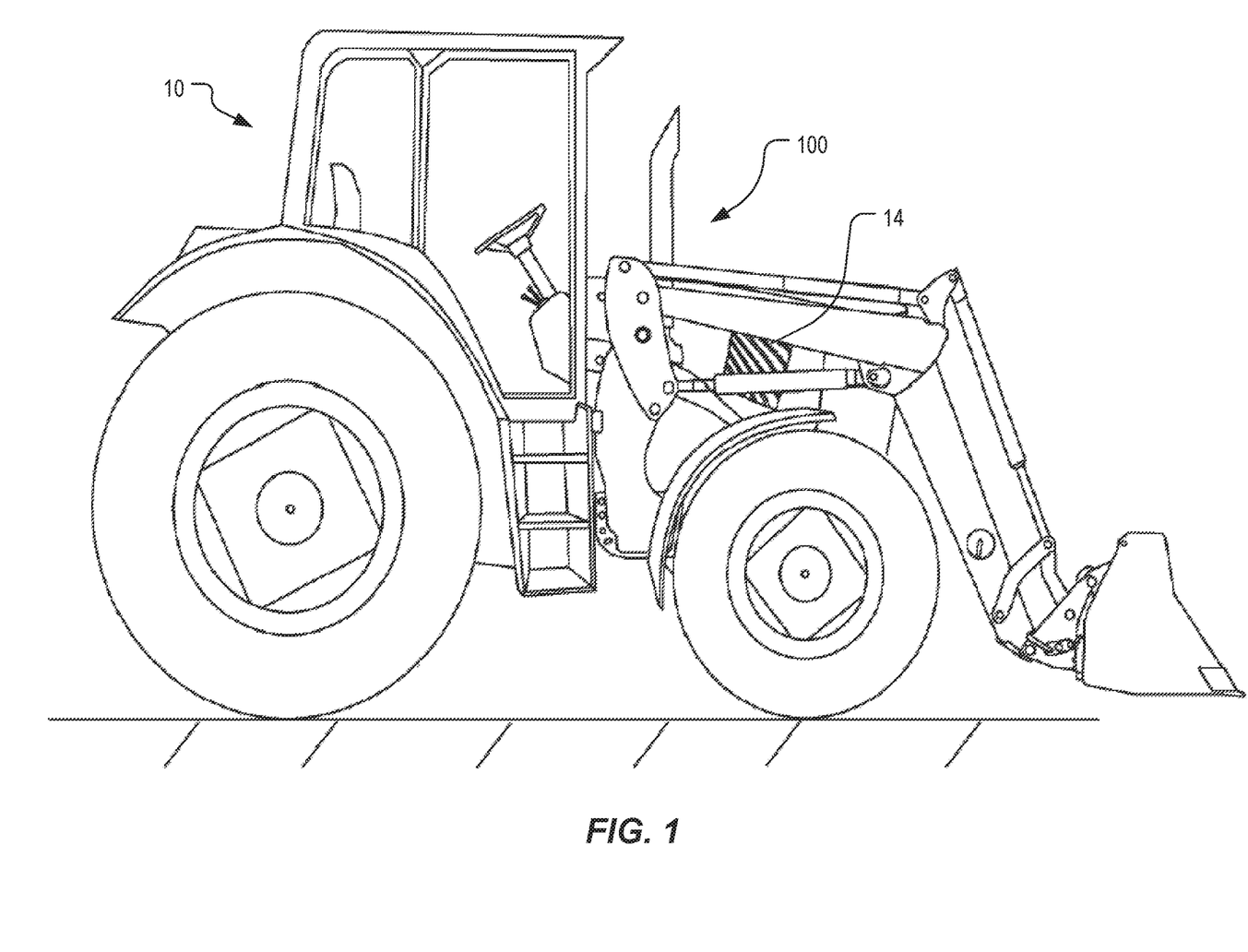
FIG. 1 is a side view of a vehicle in which the disclosed system and method for regulating exhaust emissions may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
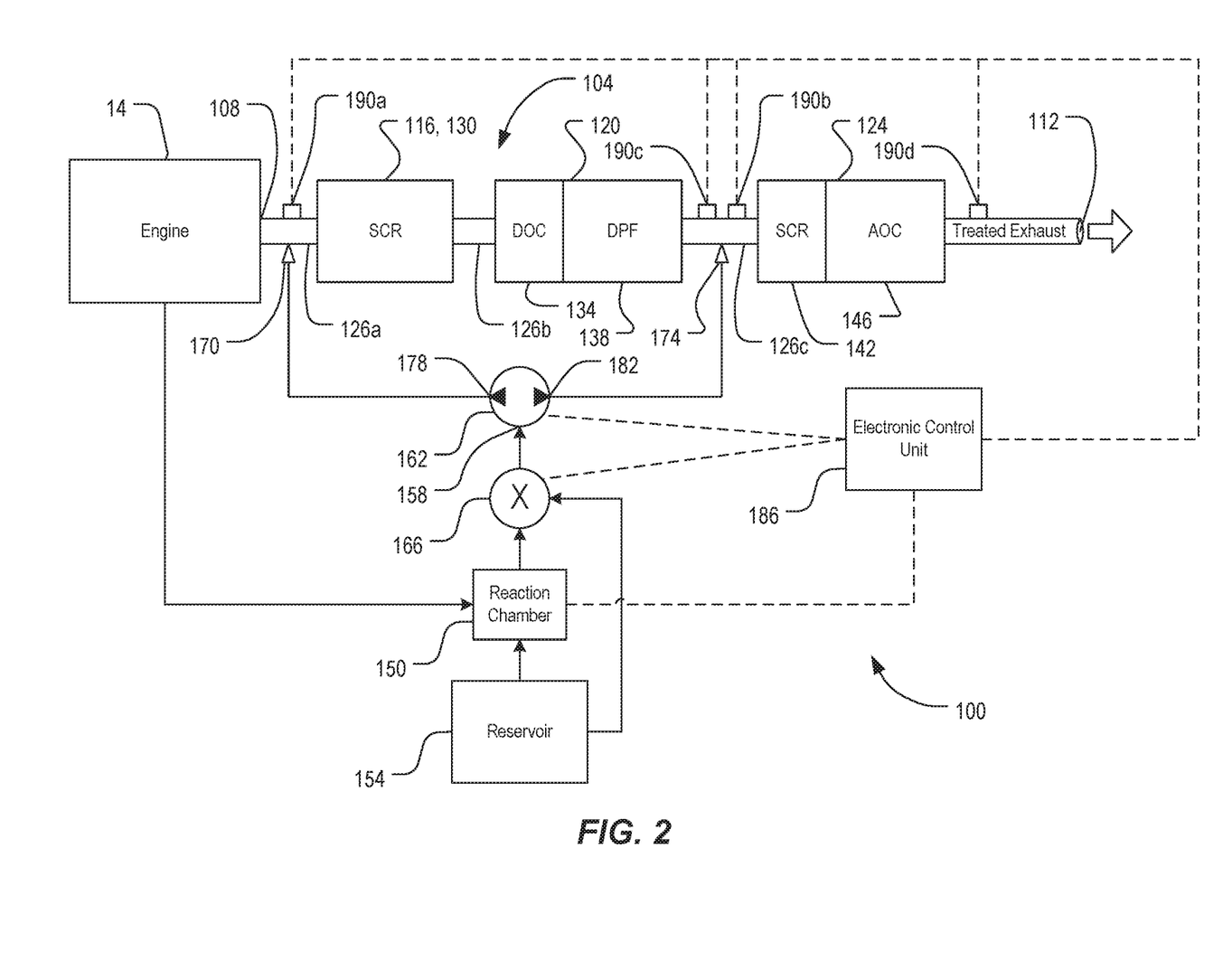
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A first treatment element 116, a second treatment element 120, and a third treatment element 124 are located in series along the exhaust pathway 104, between the inlet 108 and the outlet 112. A first transition pipe 126a couples the engine 14 and the first treatment element 116, a second transition pipe 126b couples the first treatment element 116 and the second treatment element 120, and a third transition pipe 126c couples the second treatment element 120 and the third treatment element 124. The numeric designations "first," "second," etc. are used herein for convenience and should not be regarded as defining order, quantity, or relative position. In the illustrated embodiment, the second treatment element 120 is an intermediate treatment element disposed between the first treatment element 116 and the third treatment element 124; however, in other embodiments, the relative positions of the treatment elements 116, 120, 124 may vary.

The first treatment element 116 in the illustrated embodiment includes a first selective catalytic reduction (SCR) element 130. The first SCR element 130 may include, for example, a catalytic washcoat on a monolithic support material, such as ceramic. The washcoat may include one or more metal-based catalysts, such as a copper-based catalyst, and iron-based catalyst, a vanadium-based catalyst, or the like, coated and extruded. Alternatively or additionally, the washcoat may include one or more zeolites. The first SCR element 130 may be used to reduce $NO_x$ from exhaust gas passing through the first SCR element 130. In other embodiments, the first treatment element 116 may include a different exhaust treatment configuration.

The illustrated second treatment element 120 includes a diesel oxidation catalyst (DOC) 134 having, for example, a honeycomb support coated with a catalytic material containing one or more precious metals, such as a platinum group metal. The DOC 134 may be used to reduce carbon monoxide and hydrocarbons from exhaust passing through the DOC 134. The second treatment element 120 also includes a diesel particulate filter (DPF) 138 having porous filter media configured to capture particulate matter and oxidize soot from the exhaust. The illustrated DPF 138 is coupled to the DOC 134 downstream of the DOC 134. In other embodiments, the second treatment element 120 may include a different exhaust treatment configuration.

The third treatment element 124 in the illustrated embodiment includes a second SCR element 142 and an ammonia oxidation catalyst (AOC) 146. Like the first SCR element 130, the second SCR element 142 may include a catalytic washcoat on a monolithic support material. The first and second SCR elements 130, 142 may use the same or different washcoat compositions. In some embodiments, the second SCR element 142 has a larger $NO_x$ reduction capacity than the first SCR element 130, but the relative $NO_x$ reduction capacities of the SCR elements 130, 142 may vary. The second SCR element 142 and the AOC 146 are positioned in series, with the AOC 146 located downstream of the second SCR element 142. The AOC 146 may be used to convert excess ammonia leaving the SCR element 142 (e.g., to nitrogen and water). In some embodiments, the AOC 146 may be omitted. Alternatively, the AOC 146 may be provided as a separate treatment element positioned downstream of the third treatment element 124.

With continued reference to FIG. 2, the exhaust gas treatment system 100 includes reaction chamber 150 that generates and stores a first reductant and a reservoir 154 that stores a second reductant having a different composition than the first reductant. The reaction chamber 150 is made of a non-reactive, corrosion-resistant material such as stainless steel and is constructed to withstand sustained high internal pressure. In the illustrated embodiment, the reaction chamber 150 is fluidly coupled to the reservoir 154 to receive a quantity of the second reductant from the reservoir and to selectively convert the second reductant into the first reductant. The second reductant is a urea-based solution, which is preferably diesel exhaust fluid (DEF), and the first reductant is a solution containing ammonium carbamate ($NH_2COONH_4$). The reaction chamber 150 includes a heater (not shown) that can heat the second reductant in the reaction chamber 150 to an elevated temperature (e.g., about 150 degrees Celsius or more) at which hydrolysis of the urea occurs, in accordance with Equation (2):

$$CO(NH_2)_2 + H_2O \rightarrow NH_2COONH_4 \qquad (2)$$

The heater preferably includes one or more electric heating elements powered by the engine 14, via the electrical system of the vehicle 10. However, the heater may use any other suitable means for heating the reaction chamber 150.

The reaction chamber 150 and the reservoir 154 are each selectively fluidly coupled to an inlet 158 of a pump 162 via a valve 166. The valve 166 is a directional control valve that is actuatable between a first position in which the valve 166 fluidly communicates the reaction chamber 150 with the pump 162 and a second position in which the valve 166 fluidly communicates the reservoir 154 with the pump 162. The valve 166 is preferably a solenoid-actuated valve capable of remote actuation. The pump 162 can thus draw the first reductant from the reaction chamber 150 or the second reductant from the reservoir 154, depending on the position of the valve 166. In some embodiments, the pump 162 may be a variable speed pump.

With continued reference to FIG. 2, the exhaust gas treatment system 100 further includes a first injector 170 and a second injector 174 coupled to the exhaust pathway 104. In the illustrated embodiment, the pump 162 includes a first outlet 178 fluidly coupled to the first injector 170 and a second outlet 182 fluidly coupled to the second injector 174. The pump 162 may include an integrated directional control valve configured to direct the output flow of the pump to the first injector 170, the second injector 174, or both. Alternatively, the pump 162 may be provided with a single outlet, and flow to the first and second injectors 170, 174 may be controlled by one or more valves downstream of the pump 162. The first injector 170 is positioned to introduce reductant into the first transition pipe 126a, upstream of the first treatment element 116. The second injector 174 is positioned to introduce reductant into the third transition pipe 126c, downstream of the second treatment element 120 and upstream of the third treatment element 124 (i.e. between the first and third treatment elements 116, 124).

Figure 3:
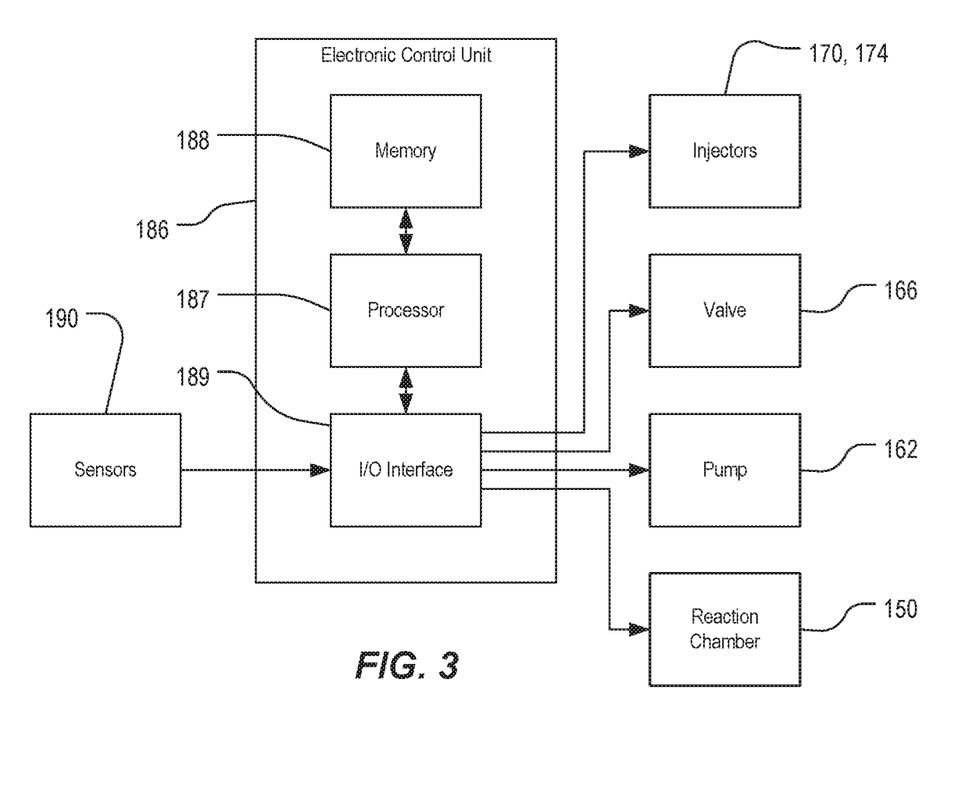
FIG. 3 is a block diagram of an electronic control unit of the exhaust gas treatment system of FIG. 2.

An electronic control unit (ECU 186) is provided to actively control various aspects of the operation of the exhaust gas treatment system 100. FIG. 3 illustrates an example of the ECU 186. The ECU 186 includes a plurality of electrical and electronic components that provide power, operational control, and protection to the components and modules within the ECU 186. In particular, the ECU 186 includes, among other things, an electronic processor 187 (e.g., a programmable microprocessor, microcontroller, or similar device), non-transitory, machine-readable memory 188, and an input/output interface 189. The electronic processor 187 is communicatively coupled to the memory 188 and configured to retrieve from memory 188 and execute, among other things, instructions related to the control processes and methods described herein. In other embodiments, the ECU 186 includes additional, fewer, or different components.

The ECU 186 is communicatively coupled (e.g., via a wired or wireless connection to the input/output interface 189) to one or more sensors 190, which provide feedback to the ECU 186 indicative of the operating state and performance of the exhaust gas treatment system 100. In the illustrated embodiment, the system 100 includes a first temperature sensor 190*a*, a second temperature sensor 190*b*, a first $NO_x$ sensor 190*c*, and a second $NO_x$ sensor 190*d* (FIG. 2). In some embodiments, additional or alternative sensors may be provided to monitor various other parameters of the exhaust gas treatment system 100. These sensors may monitor, for example, $NO_x$ concentrations, ammonia concentrations, temperature, exhaust flow rate, pressure drop, ash loading, etc. at one or more points along the exhaust pathway 104. In the illustrated embodiment, the ECU 186 is also communicatively coupled to the pump 162, the valve 166, and the reaction chamber 150 (via the input/output interface 189) for controlling their operation. The ECU 186 may also be communicatively coupled to the injectors 170, 174 for modulating the flow of reductant through each of the injectors. In addition, the ECU 186 may be configured to communicate with external systems including, for example, engine controls and/or operator controls.

In operation, untreated exhaust from the internal combustion engine 14 is directed into the exhaust pathway 104 at the inlet 108 (FIG. 2). The ECU 186 periodically or continuously monitors the temperature sensors 190*a*, 190*b* in order to determine the temperature of the exhaust gas as it enters the first treatment element 116 and the second treatment element 124, respectively. The ECU 186 compares the sensed temperature from each sensor 190*a*, 190*b* with a threshold temperature stored in the memory 188. If the sensed temperatures are greater than the threshold temperature, which is expected during ordinary operation, the ECU 186 controls the exhaust gas treatment system 100 according to a warm temperature operating routine. If one or both of the sensed temperatures is less than the threshold temperature, which may occur, for example, after cold-starting the engine 14 or when operating the vehicle 10 in cold ambient conditions, the ECU 186 controls the exhaust gas treatment system 100 according to a cold temperature operating routine. In the illustrated embodiment, the threshold temperature is about 200 degrees Celsius, which corresponds to the minimum temperature at which DEF can be introduced into the exhaust pathway 104 without significant urea deposition.

When executing the warm temperature operating routine, the ECU 186 actuates the valve 166 to the second position. The ECU 186 then activates the pump 162, which draws DEF directly from the reservoir 154. In some embodiments, the ECU 186 controls the pump 162 to only supply DEF to the second injector 174, such that substantially no DEF flows to the first injector 170. Alternatively, the ECU 186 may control the pump 162 to supply DEF to both the first and second injectors 170, 174.

Untreated exhaust flows from the engine 14 into the first treatment element 116, which reduces $NO_x$ in the presence of the catalyst in the first SCR element 130 to form nitrogen and water. The exhaust then flows into the second treatment element 120. The DOC 134 reduces carbon monoxide and hydrocarbons from the exhaust, and the DPF 138 captures particulate matter from the exhaust. At warm temperatures, the DOC 134 also increases the fraction of $NO_2$ in the exhaust, which promotes oxidation of soot on the filter media of the DPF 138.

The DEF is injected into the partially-treated exhaust downstream of the second treatment element 120 via the second injector 174. The DEF and exhaust mixture then enters the third treatment element 124. The DEF decomposes to produce ammonia, which reacts with $NO_x$ in the presence of the catalyst in the second SCR element 142 to form nitrogen and water. Any unreacted ammonia is subsequently oxidized in the AOC 146. The treated exhaust then exits the exhaust gas treatment system 100 through the outlet 112.

The ECU 186 may vary the flow rate of DEF through one or both of the injectors 170, 174 based on $NO_x$ concentration data received by the ECU 186 from the $NO_x$ sensors 190*c*, 190*d* and on predictive modeling of the combustion process in the engine 14. For example, if the $NO_x$ sensor 190*d* detects an elevated level of $NO_x$ in the treated exhaust downstream of the third treatment element 124, the ECU 186 may command the pump 162 to increase the flow rate of DEF injection through either or both the first and second injectors 170, 174. Because proper soot oxidation in the DPF 138 requires the presence of $NO_2$, the amount of reductant flowing through the first injector 170 is limited so that some of the $NO_2$ in the exhaust remains unreacted through the first treatment element 116.

During the warm temperature operating routine, the ECU 186 may command the reaction chamber 150 to generate ammonium carbamate. The ECU 186 may initiate generation of ammonium carbamate based on feedback indicating that the available supply of ammonium carbamate must be replenished. For example, the ECU 186 may receive feedback from a fluid level sensor in the reaction chamber 150, a flow meter downstream of the reaction chamber 150, a counter, a timer, a command received from a user of the vehicle 10, or the like. Once the ECU 186 initiates ammonium carbamate generation, the reaction chamber 150 receives a quantity of DEF from the reservoir 154 (e.g., by opening a valve or operating a pump (not shown) to transfer DEF from the reservoir 154 into the reaction chamber 150. The ECU 186 then seals the reaction chamber 150 and initiates a heating cycle to heat the contents of the reaction chamber 150 to an elevated temperature (e.g., at least 150 degrees Celsius). The DEF undergoes hydrolysis in accordance with Equation (2) and produces an ammonium carbamate solution, which then remains in the reaction chamber 150 for future use.

When executing the cold temperature operating routine, the ECU 186 actuates the valve 166 to the first position. The ECU 186 then activates the pump 162, which draws the ammonium carbamate solution from the reaction chamber 150. Ammonium carbamate solution advantageously has a lower freezing point than DEF and will remain liquid in cold weather. In extremely cold weather, however, should the ammonium carbamate solution freeze, the ECU 186 may active the heater of the reaction chamber 150 in order to thaw the ammonium carbamate solution. In some embodiments, the ECU 186 controls the pump 162 to only supply ammonium carbamate to the first injector 170, such that substantially no ammonium carbamate flows to the second injector 174. Alternatively, the ECU 186 may control the pump 162 to supply the ammonium carbamate to both the first and second injectors 170, 174.

Untreated exhaust flows from the engine 14, mixes with the ammonium carbamate, and then enters the first treatment element 116. Ammonium carbamate decomposes at relatively low exhaust temperatures (i.e. above about 50 degrees Celsius) to form ammonia and carbon dioxide in accordance with Equation (3):

$$NH_2COONH_4 \rightarrow 2NH_3 + CO_2 \qquad (3)$$

The ammonia and $NO_x$ react in the presence of the catalyst in the first SCR element 130 to form nitrogen and water. The exhaust then flows into the second treatment element 120. The DOC 134 reduces carbon monoxide and hydrocarbons from the exhaust, and the DPF 138 captures particulate matter from the exhaust. Any remaining $NO_x$ is reacted in the second SCR element 142, while any unreacted ammonia is subsequently oxidized in the AOC 146. The treated exhaust then exits the exhaust gas treatment system 100 through the outlet 112. The ECU 186 may vary the flow rate of ammonium carbamate through one or both of the injectors 170, 174 based on $NO_x$ concentration data received by the ECU 186 from the $NO_x$ sensors 190c, 190d. Because the ammonium carbamate solution that is transformed from DEF in the reaction chamber 150 does not change the solution density (i.e. there is no material loss), the ECU 186 need not make any control compensation to deliver the desired amount of ammonia for the SCR reactions when switching between DEF and the ammonium carbamate solution.

By selectively introducing ammonium carbamate into the exhaust pathway 104 instead of DEF at low temperatures, the exhaust gas treatment system 100 can achieve effective low temperature $NO_x$ reduction. In addition, because the exhaust treatment system 100 can produce the ammonium carbamate on demand, the user need only supply the exhaust treatment system 100 with DEF, which is inexpensive and widely available.

Figure 4:
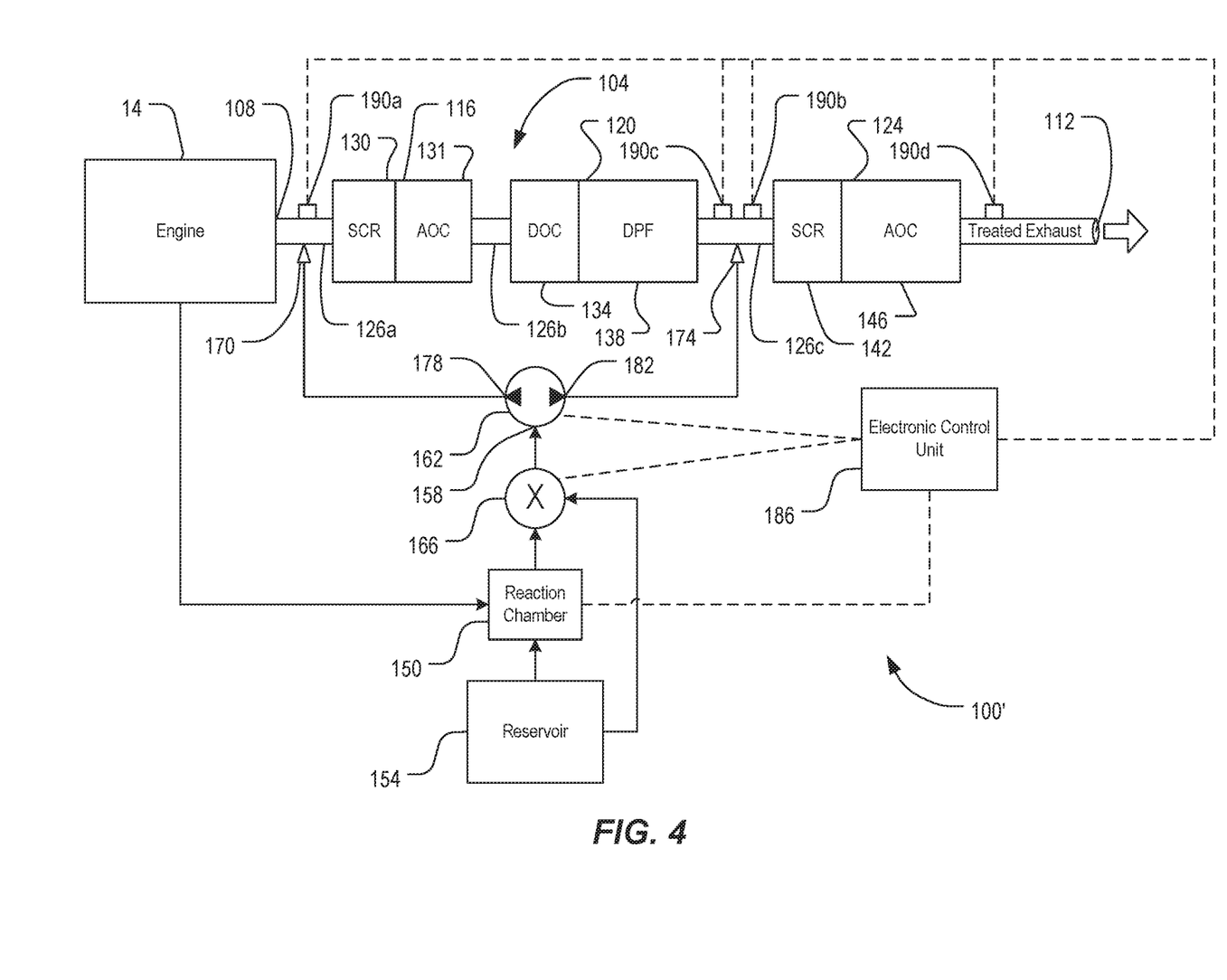
FIG. 4 is a schematic diagram of an exhaust gas treatment system according to another embodiment.

FIG. 4 illustrates an exhaust gas treatment system 100' according to another embodiment. The exhaust gas treatment system 100' is similar to the exhaust gas treatment system 100 described above with reference to FIG. 2, except that the first treatment element 116 further includes an AOC 131 downstream of the first SCR element 130. The AOC 131 may advantageously avoid conversion of excess ammonia into $NO_x$ by the precious metal containing DOC 134 or any precious metals that have migrated from the DOC 134 and become entrained on the filter substrate of the DPF 138.

Various features of the disclosure are set forth in the following claims.

What is claimed is:

1. An exhaust gas treatment system for an internal combustion engine, the system comprising:
   an exhaust gas pathway configured to receive exhaust gas from the internal combustion engine;
   a temperature sensor configured to sense a temperature of the exhaust gas;
   a first injector configured to inject a first reductant into the exhaust gas pathway at a first location;
   a first treatment element positioned downstream of the first location;
   a second injector configured to inject a second reductant of a different composition than the first reductant into the exhaust gas pathway at a second location downstream of the first treatment element;
   a second treatment element positioned downstream of the second location; and
   a controller configured to
      initiate injection of the first reductant into the exhaust gas pathway via the first injector when the sensed temperature is below a threshold temperature,
      initiate injection of the second reductant into the exhaust gas pathway via the second injector when the sensed temperature is above the threshold temperature, and
      initiate generation of the first reductant when the sensed temperature is above the threshold temperature.

2. The exhaust gas treatment system of claim 1, wherein the threshold temperature is about 200 degrees Celsius.

3. The exhaust gas treatment system of claim 1, wherein the first reductant includes ammonium carbamate.

4. The exhaust gas treatment system of claim 1, wherein the second reductant includes diesel exhaust fluid.

5. The exhaust gas treatment system of claim 1, further comprising a reservoir configured to store a volume of the second reductant and a reaction chamber configured to receive a quantity of the second reductant from the reservoir and convert the second reductant into the first reductant.

6. The exhaust gas treatment system of claim 5, further comprising an electric heating element configured to selectively heat the reaction chamber to convert the second reductant into the first reductant.

7. The exhaust gas treatment system of claim 5, further comprising a pump fluidly coupled to the reaction chamber and to the reservoir, wherein the controller is configured to control the pump to pump the first reductant from the reaction chamber to the first injector when the sensed temperature is below the threshold temperature and to pump the second reductant from the reservoir to the second injector when the sensed temperature is above the threshold temperature.

8. The exhaust gas treatment system of claim 1, wherein the first treatment element includes a selective catalytic reduction (SCR) element.

9. The exhaust gas treatment system of claim 8, wherein the second treatment element includes an SCR element.

10. The exhaust gas treatment system of claim 9, wherein the second treatment element further includes an ammonia oxidation catalyst (AOC).

11. The exhaust gas treatment system of claim 1, further comprising an intermediate treatment element positioned in the exhaust gas pathway between the first treatment element and the second treatment element.

12. The exhaust gas treatment system of claim 11, wherein the intermediate treatment element includes a diesel oxidation catalyst (DOC) and a diesel particulate filter (DPF).

13. The exhaust gas treatment system of claim 1, wherein the temperature sensor is configured to sense the temperature of the exhaust gas proximate at least one of the first treatment element or the second treatment element.

14. An exhaust gas treatment system for an internal combustion engine, the system comprising:
   an exhaust gas pathway configured to receive exhaust gas from the internal combustion engine;
   a first injector configured to inject an ammonium carbamate solution into the exhaust gas pathway at a first location;
   a first treatment element positioned downstream of the first location;

a reservoir configured to store a volume of diesel exhaust fluid;

a reaction chamber configured to convert diesel exhaust fluid from the reservoir into additional ammonium carbamate solution, and to supply the ammonium carbamate solution to the first injector during a first operating state of the exhaust gas treatment system; and a controller configured to initiate injection of the ammonium carbamate solution into the exhaust gas pathway via the first injector during the first operating state, and initiate generation of the additional ammonium carbamate solution in the reaction chamber during a second operating state of the exhaust gas treatment system when a temperature of the exhaust gas proximate the first treatment element is greater than about 200 degrees Celsius.

15. The exhaust gas treatment system of claim 14, further comprising a second injector in fluid communication with the reservoir and configured to inject diesel exhaust fluid into the exhaust gas pathway at a second location downstream of the first treatment element, wherein the controller is configured to initiate injection of diesel exhaust fluid into the exhaust gas pathway via the second injector during the second operating state.

16. The exhaust gas treatment system of claim 15, wherein the controller is configured to initiate injection of diesel exhaust fluid into the exhaust gas pathway via the first injector during the second operating state.

* * * * *